(12) United States Patent
Jo (10) Patent No.: US 12,524,914 B2
(45) Date of Patent: Jan. 13, 2026

(54) METHOD AND APPARATUS WITH TRAFFIC LIGHT IMAGE COMPOSITION (71) Applicant: SAMSUNG ELECTRONICS CO., LTD., Suwon-si (KR)

(72) Inventor: Dae Ung Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 18/331,634

(22) Filed: Jun. 8, 2023

(65) Prior Publication Data

US 2024/0153144 A1 May 9, 2024

(30) Foreign Application Priority Data

Nov. 8, 2022 (KR) ........................ 10-2022-0147922

(51) Int. Cl.
G06T 7/90 (2017.01)
G06T 5/20 (2006.01)
G06T 7/194 (2017.01)
G06V 10/54 (2022.01)
G06V 10/60 (2022.01)

(52) U.S. Cl.
CPC ................. *G06T 7/90* (2017.01); *G06T 5/20* (2013.01); *G06T 7/194* (2017.01); *G06V 10/54* (2022.01); *G06V 10/60* (2022.01); *G06T 2207/10024* (2013.01)

(58) Field of Classification Search
CPC .. G06T 7/90; G06T 5/20; G06T 7/194; G06T 2207/10024; G06T 7/70; G06T 7/11; G06T 5/50; G06T 2207/20081; G06T 2207/30236; G06V 10/54; G06V 10/60; G06V 10/26; G06V 20/56
See application file for complete search history.

(56) References Cited

U.S. PATENT DOCUMENTS

| 11,301,733 | B2 | 4/2022 | Shlens et al. | |
|---|---|---|---|---|
| 2011/0175984 | A1* | 7/2011 | Tolstaya | G06T 7/11 |
| | | | | 382/103 |
| 2012/0188234 | A1* | 7/2012 | Ortega | G06T 15/20 |
| | | | | 345/419 |
| 2014/0056438 | A1 | 2/2014 | Baalu et al. | |
| 2021/0303886 | A1 | 9/2021 | Hassan et al. | |

FOREIGN PATENT DOCUMENTS

| JP | 2022-064850 A | 4/2022 |
|---|---|---|
| JP | 2022-091270 A | 6/2022 |

OTHER PUBLICATIONS

Wang et al. "TI-gan: Improving traffic light recognition via data synthesis for autonomous driving." arXiv preprint arXiv:2203.15006, Mar. 28, 2022 (pp. 1-13).

* cited by examiner

*Primary Examiner* — Duy M Dang
(74) *Attorney, Agent, or Firm* — NSIP Law (57) ABSTRACT

A method and apparatus for composing a traffic light image are provided, where the method includes separating a foreground and a background of each of the one or more actual images using a color separator, training a color transformation matrix configured to estimate a color value of the foreground, training a position estimator configured to estimate a position of a center of the foreground from a brightness value of each of the one or more actual images, and generating a target image based on inputting an input image to the position estimator and the color separator.

20 Claims, 9 Drawing Sheets

METHOD AND APPARATUS WITH TRAFFIC LIGHT IMAGE COMPOSITION

CROSS-REFERENCE TO RELATED APPLICATIONS

This application claims the benefit under 35 USC § 119(a) of Korean Patent Application No. 10-2022-0147922, filed on Nov. 8, 2022, in the Korean Intellectual Property Office, the entire disclosure of which is incorporated herein by reference for all purposes.

BACKGROUND

1. Field

The following description relates to a method and apparatus for composing and generating a traffic light image based on training from other traffic light images.

2. Description of Related Art

Autonomous vehicles must operate through a multi-faceted judgment process based on road conditions, surrounding environments, driving routes, and traffic lights. Research and development of technologies related to autonomous vehicles is being actively conducted. In addition, research and development on technology for analyzing closed-circuit television (CCTV) images for observing road conditions is also being conducted. For example, even if a route has been driven in the past, the current driving may depend on weather factors such as snow, rain, fog, etc., and time factors such as night. Depending on examples and the present condition, the autonomous driving of a vehicle may be disabled.

The above description has been possessed or acquired by the inventor(s) in the course of conceiving the present disclosure and is not publicly known before the present application is filed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of composing an image, the method including separating a foreground and a background of each of the one or more actual images using a color separator, training a color transformation matrix configured to estimate a color value of the foreground, training a position estimator configured to estimate a position of a center of the foreground from a brightness value of each of the one or more actual images, and generating a target image based on inputting an input image to the position estimator and the color separator.

The generating of the target image may include extracting a color value of a background of the input image using the color separator, determining a color value of a foreground of the target image from the color value of the background, using the color transformation matrix, determining a position of a target signal for the input image using the position estimator, generating a signal mask based on the position, and generating the target image by composing the color value of the foreground and the signal mask.

The separating of the foreground and the background may include comparing a representative color value of the foreground to a representative color value of the background of each of the one or more actual images, and separating and storing color values of the foreground and color values of the background, based on a result of the comparing.

The training of the color transformation matrix may include estimating the color value of the foreground from a color value of the background, using the stored color values of the foreground and the stored color values of the background.

The training of the position estimator may include calculating a brightness value of each of pixels of the one or more actual images and obtaining vertical sums and horizontal sums of each of the pixels, estimating a position having a highest value among the vertical sums as a horizontal position, estimating a position having a highest value among the horizontal sums as a vertical position, and storing the horizontal position and the vertical position.

The training of the position estimator may include training a relationship between the background of each of the one or more actual images and the horizontal position through a Gaussian process, and training a relationship between the background of each of the one or more actual images and the vertical position through a Gaussian process.

The generating of the signal mask may include generating the signal mask using Gaussian filtering.

The generating of the signal mask may include generating the signal mask based on a preset rule.

The generating of the signal mask may include adding a highlight mask to the signal mask.

The generating of the signal mask may include adding Gaussian noise to the signal mask.

In another general aspect, there is provided an apparatus for composing an image, the apparatus including a processor configured to separate a foreground and a background of each of the one or more actual images using a color separator, train a color transformation matrix configured to estimate a color value of the foreground, train a position estimator configured to estimate a position of a center of the foreground from a brightness value of each of the one or more actual images, and generate a target image based on inputting an input image to the position estimator and the color separator.

The processor may be configured to extract a color value of a background of the input image using the color separator, determine a color value of a foreground of the target image from the color value of the background, using the color transformation matrix, determine a position of a target signal for the input image using the position estimator, generate a signal mask based on the position, and generate the target image by composing the color value of the foreground and the signal mask.

The color separator may be configured to compare a representative color value of the foreground to a representative color value of the background of each of the one or more actual images, and separate and store color values of the foreground and color values of the background, based on a result of the comparison.

The processor may be configured to estimate the color value of the foreground from a color value of the background, using the stored color values of the foreground and the stored color values of the background.

The processor may be configured to calculate a brightness value of each of pixels of the one or more actual images and obtain vertical sums and horizontal sums of each of the pixels, estimate a position having a highest value among the vertical sums as a horizontal position, estimate a position having a highest value among the horizontal sums as a vertical position, and store the horizontal position and the vertical position.

The processor may be configured to train a relationship between the background of each of the one or more actual images and the horizontal position through a Gaussian process, and train a relationship between the background of each of the one or more actual images and the vertical position through a Gaussian process.

The processor may be configured to generate the signal mask using Gaussian filtering.

The processor may be configured to generate the signal mask based on a preset rule.

The processor may be configured to add a highlight mask to the signal mask.

The processor may be configured to add Gaussian noise to the signal mask.

Other features and aspects will be apparent from the following detailed description, the drawings, and the claims.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. As used herein, the term "and/or" includes any and all combinations of one or more of the associated listed items. For example, "A and/or B" may be interpreted as "A," "B," or "A and B.".

The terminology used herein is for the purpose of describing particular examples only and is not to be limiting of the examples. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, examples will be described in detail with reference to the accompanying drawings. When describing the examples with reference to the accompanying drawings, like reference numerals refer to like elements and any repeated description related thereto will be omitted.

In some examples, described herein is a training of a classification model for traffic lights so that driving vehicles can acquire surrounding environment information to increase identification of the surrounding environment and the vehicle may drive safely and without malfunctions.

Figure 1:
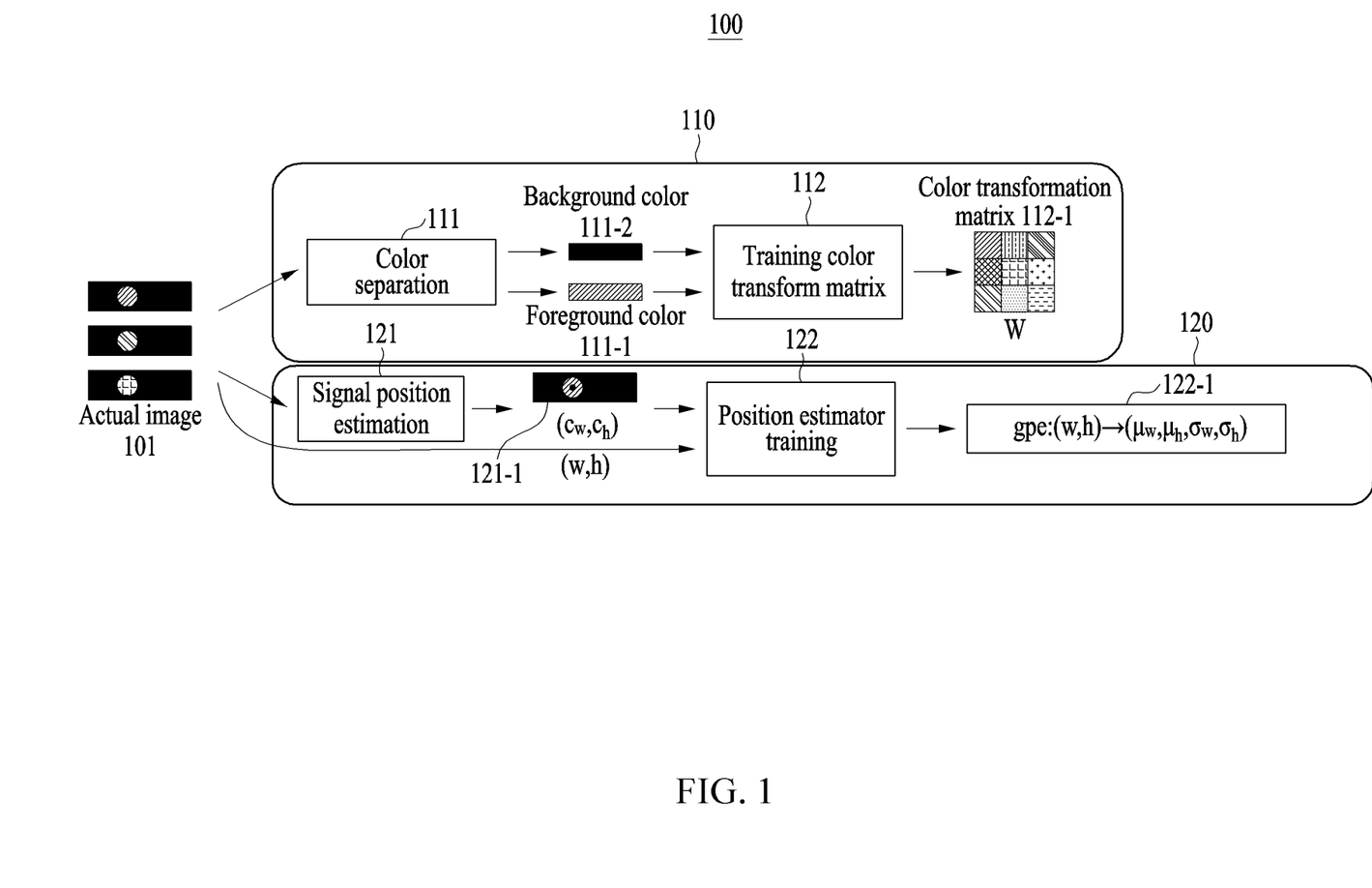
FIG. 1 illustrates an example of an image training process.

FIG. 1 illustrates an example of an image training process.

As illustrated in FIG. 1, one or more blocks and a combination thereof may be implemented by a special-purpose hardware-based computer that performs a function, or a combination of computer instructions and special-purpose hardware.

Operations of FIG. 1 may be performed in the shown order and manner. However, the order of some operations may change, or some of the operations may be omitted, without departing from the spirit and scope of the shown example. The operations shown in FIG. 1 may be performed in parallel or simultaneously.

Referring to FIG. 1, an image expressed in the same pattern in an actual image 101, a background color 111-2, a foreground color 111-1, a color transformation matrix W 112-1, and a position estimation result 121-1 may express the same color. For example, when a hatched pattern of the actual input image 101 represents a bright yellow signal, a hatched pattern of the foreground color 111-1 and the color transformation matrix W 112-1 may also represent the same color of the bright yellow signal. In addition, those expressed in different patterns of the actual input image 101 may be the same yellow signal but may represent a different color in actual observation due to a difference of a degree of brightness or blur depending on the surrounding environment.

Figure 7:
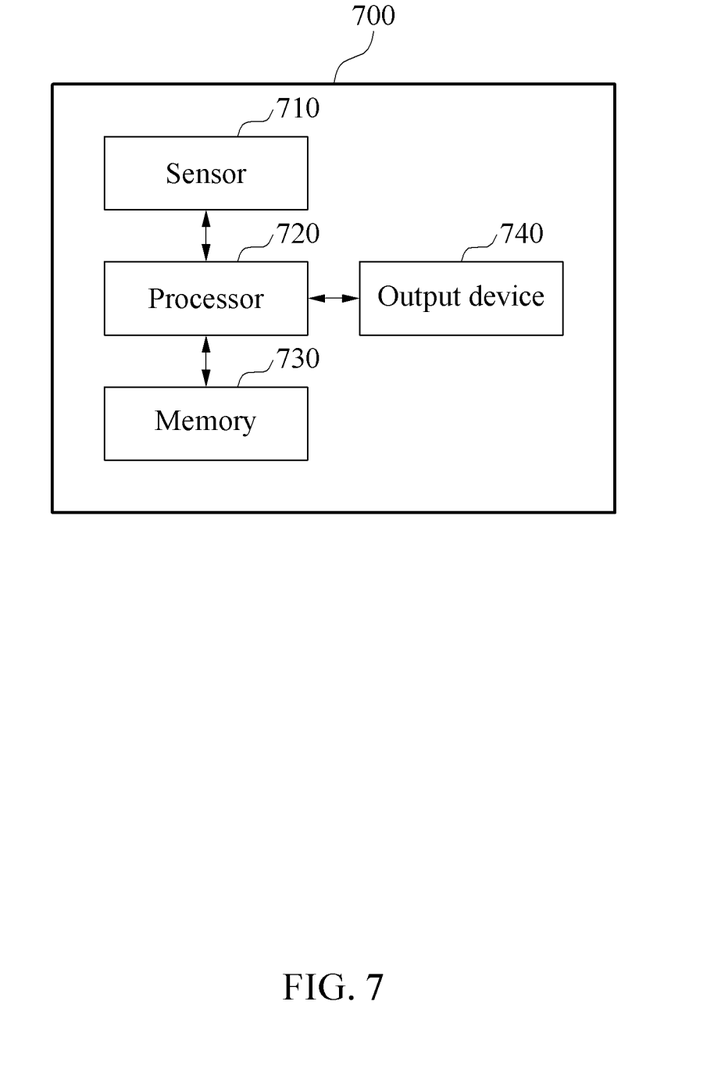
FIG. 7 illustrates an example of a configuration of an electronic device.

An actual image training process 100 may be performed by a processor (such as processor 720 of FIG. 7).

In operation 110, as described next, the processor may perform a training color transformation matrix algorithm on the actual input image 101 (e.g., a traffic light image).

In operation 111, the processor may separate the foreground color 111-1 (e.g., a signal color of a traffic light) and the background color 111-2 (e.g., a back plate of a traffic light) through a color separator. The processor may perform color transformation matrix training 112 using the separated foreground color 111-1 and the separated background color 111-2.

For example, the processor may extract representative color values for the foreground and background by applying k-means clustering (k=2) to 3-channel pixel values of the actual input image 101 input to the color separator. When the k-means clustering is applied to the actual input image 101, a total of two centers may be determined. Since an L2-norm value of a pixel of the foreground of the actual input image 101 is greater than an L2-norm value of a pixel of the background, the cluster-center having the greater L2-norm value among two centers may be defined as a representative color value of the foreground, and the rest of the center may be defined as a representative color of the background. The processor may extract a color value (f(i)) of the foreground and a color value (b(i)) of the background of each of the actual input images 101 (I(i)). In some examples, a brightness of the color value of the foreground may be greater than or equal to a brightness of the color value of the background (e.g., $\|b(i)\|2 \le \|f(i)\|2$). Each set of the foreground and background values for one or more actual images may be defined as $F=[f(1), \ldots, f(i), \ldots, f(N)]$, $B=[b(1), \ldots, b(i), \ldots, b(N)]$.

The processor may extract the color transformation matrix W 112-1 by performing training on the color transformation matrix 112 using a value of the separated foreground color 111-1 and a value of the separated background color 111-2. The color transformation matrix W 112-1 will be described further with reference to FIG. 4.

For example, the processor may calculate the color transformation matrix W 112-1 as shown in Equation 1 below, using sets F and B, which are sets of the foreground and background values. The training of the color transformation matrix may include learning a 3×3 matrix of three-dimensional (3D) vectors F and B.

$$W = FB+ \quad \text{Equation 1}$$

In Equation 1, B+ denotes a pseudo inverse of B.

In operation 120, the processor may train a position estimator that estimates a position of a center of the foreground of the actual input image 101. Since a position of a signal has a significant consequence, composing the estimated foreground color value at any arbitrary position may lead to composing an inappropriate signal image.

In operation 121, the processor may estimate a position of a center of a signal of the actual input image 101. The processor may estimate the position of the center of the signal as shown in Equation 2 below.

Equation 2

$$c_w^{(i)} = \mathrm{argmax}_x \Sigma_{c=1}^3 \Sigma_{y=1}^h I^{(i)}(x,y,c) \tag{1}$$

$$c_w^{(i)} = \mathrm{argmax}_x \Sigma_{c=1}^3 \Sigma_{x'=x-1}^{x+1} \Sigma_{y=1}^h I^{(i)}(x',y,c) \ldots \text{(robust version)} \tag{2}$$

$$c_h^{(i)} = \mathrm{argmax}_y \Sigma_{c=1}^3 \Sigma_{x=1}^w I^{(i)}(x,y,c) \tag{3}$$

$$c_h^{(i)} = \mathrm{argmax}_y \Sigma_{c=1}^3 \Sigma_{y'=y-1}^{y+1} \Sigma_{x=1}^w I^{(i)}(x,y',c) \ldots \text{(robust version)} \tag{4}$$

Based on the fact that a color value of a signal is greater (in terms of L2-norm) than a color value of a back plate of a traffic light, the processor may determine a position of a column and row having the largest row sum and column sum as a center position of the signal. The processor may use the sum of adjacent rows and columns for more robust position estimation.

For example, referring to (1) and (2) of Equation 2, the processor may calculate a brightness for each pixel of the actual input image 101. Assuming that a brightness is strongest where a target signal exists, the processor may calculate a sum (hereinafter, referred to as a vertical sum) of brightness values of the pixels in the same column and then selecting a position having the highest value among the vertical sums to serve as a horizontal position of the signal.

For example, referring to (3) and (4) of Equation 2, the processor may calculate a brightness for each pixel of the actual input image 101. Assuming that the brightness is strongest where the target signal exists, the processor may calculate a sum (hereinafter, referred to as a horizontal sum) of brightness values of the pixels in the same row and then determine a position having the highest value among the horizontal sums as a vertical position of the signal.

In another example, assuming that a vertical width of the actual input image 101 is tightly given, the processor may determine a center position of the vertical width of the actual input image 101 as a vertical position of the signal. Here, "tight" refers to the entire image of the actual input image 101 including only the traffic light image. That is, when a part of the actual input image 101 is cut off or a background other than the traffic light (e.g., the sky, a building, etc.) is included, the image may not be tight.

The processor may learn a relationship between the width of the background and a horizontal position of the foreground (e.g., a signal) of each of one or more actual input images 101 through a Gaussian process. When learning through the Gaussian process, since a horizontal position estimation result may be calculated in various ways, various signal positions may be estimated even for images having the same width.

In operation 122, the processor may train the position estimator based on data of horizontal and vertical positions determined in one or more actual input images 101. When an input image having sizes w and h is given, the processor may train a model that estimates center positions $c_w$ and $c_h$ of the signal. The processor may train Gaussian process models $g_w$ and $g_h$ to stochastically estimate the position of each of $c_w$ and $c_h$. A result through the Gaussian process may be expressed as Equation 3 below.

Equation 3

$$g_w:(w,h) \to (\mu_w, \sigma_w) \quad (1)$$

$$g_h:(w,h) \to (\mu_h, \sigma_h) \quad (2)$$

$$g_{pe}:=\{g_w,g_h\}:(w,h) \to (\mu_w,\mu_h,\sigma_w,\sigma_h) \quad (3)$$

Part (1) of Equation 3 represents a horizontal position estimation result and (2) of Equation 3 represents a vertical position estimation result. A final position estimator may be represented as (3) of Equation 3. A signal image composed at various positions may be obtained through an average and variance value estimated in later data synthesis.

Figure 2:
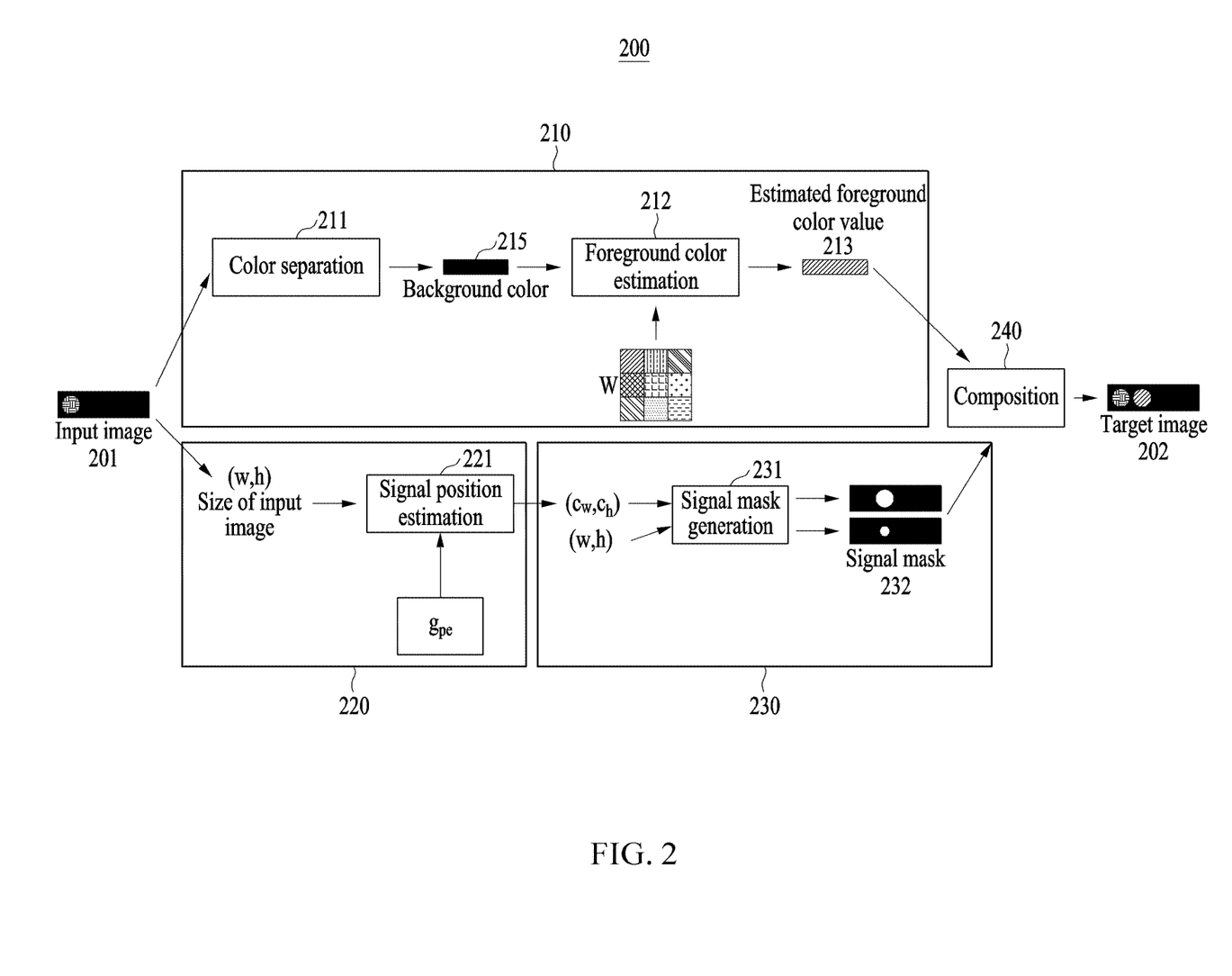
FIG. 2 illustrates an example of an image composing process.

FIG. 2 illustrates an example of an image composing process.

In FIG. 2, one or more blocks and a combination thereof may be implemented by a special-purpose hardware-based computer that performs a function, or a combination of computer instructions and special-purpose hardware.

Operations of FIG. 2 may be performed in the shown order and manner. However, the order of some operations may change, or some of the operations may be omitted, without departing from the spirit and scope of the shown example. Many of the operations shown in FIG. 2 may be performed in parallel.

The description provided with reference to FIG. 1 may be applicable to the description of FIG. 2.

Referring to FIG. 2, an image expressed by the same pattern in an input image 201, a target image 202, a background color 215, a color transformation matrix W, an estimated foreground color value 213, and a signal mask 232 may express the same color. For example, when a hatched pattern of the input image 201 represents a bright red signal, the same hatched pattern of the target image 202 may represent a bright red signal of the same color. In addition, those expressed by different patterns of the color transformation matrix W may be the same yellow signal but may represent a different color from an actual observation due to a difference of a degree of brightness or blur depending on a surrounding environment. Since a pattern of the estimated foreground color value 213 is the same as a first hatched pattern of the color transformation matrix W, the same color may be expressed.

A target image generation process 200 may be performed by a processor (such as processor 720 of FIG. 7).

In operation 210, the processor may estimate a foreground color value from an input image.

In operation 211, the processor may extract a background color value 215 from the input image 201 by using a color separator (e.g., operation 111 of FIG. 1).

In operation 212, the processor may estimate the foreground color value 213 from the extracted background color value by using the color transformation matrix W 112-1. An operation of estimating the foreground color value is further described below with reference to FIGS. 3A to 4.

In operation 220, the processor may estimate a position of the center of a signal.

In operation 221, the processor may receive the size of the input image 201 and estimate positions $c_w$ and $c_h$ of a target signal for the input image 201 using the trained position estimator.

In operation 230, the processor may generate the signal mask 232 based on a position of the estimated target signal. In operation 231, the processor may generate the signal mask 232. The operations 230 and 231 are further described with reference to FIGS. 3B and 5A to 5C.

In operation 240, the processor may generate the target image 202 by composing the estimated foreground color value 213 and the signal mask 232. The composite target image 202 will be further described with reference to FIGS. 3A to 6.

The input image 201 and the target image 202 of the present disclosure are not limited to the described examples and the input image 201 may be a green light image, a red light image, or the target image 202 may be an arrow light image (e.g., a left turn signal).

Figure 3A:
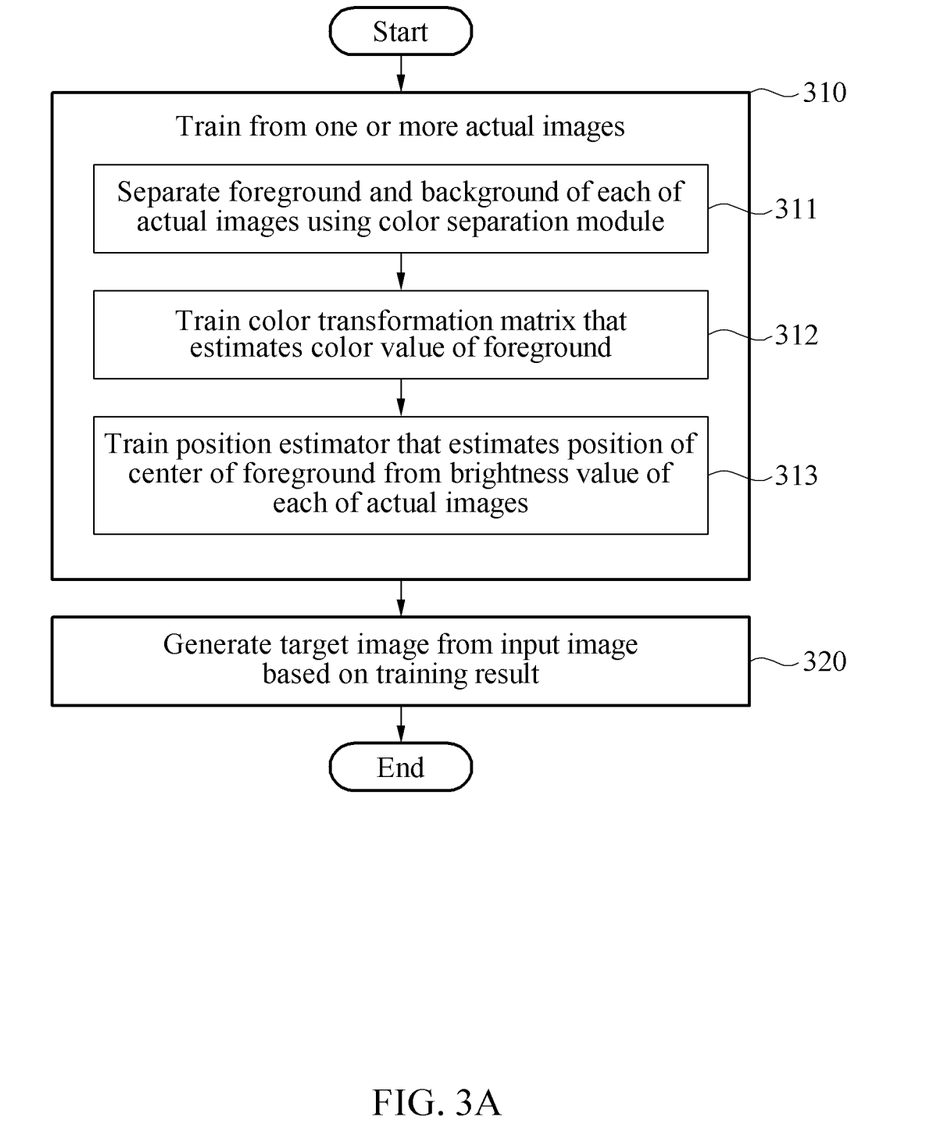
FIG. 3A illustrates another example of an image composing process.

FIG. 3A illustrates another example of an image composing process.

Referring to FIG. 3A, operations 310 to 320 may be performed by a processor described with reference to FIG. 2. The description given with reference to FIGS. 1 and 2 may be identically applicable to the description given with reference to FIG. 3A, and thus, a duplicate description is omitted.

Operations of FIG. 3A may be performed in the shown order and manner. However, the order of some operations may change, or some of the operations may be omitted, without departing from the spirit and scope of the shown example. The operations shown in FIG. 3A may be performed in parallel or simultaneously.

In operation 310, the processor may train from one or more actual images.

In operation 311, the processor may separate a foreground and a background of each of the actual images using a color separator.

In an operation of separating a foreground and a background of each of the actual images, the processor may perform an operation of comparing a representative color value of the foreground to a representative color value of the background of each of the actual images (e.g., pixels within a threshold color distance of a representative color may be deemed to be in the foreground or background, as the case may be).

In an operation of separating a foreground and a background of each of the actual images, the processor may perform an operation of separating and storing color values of the foreground and color values of the background based on a result of the comparison.

An operation of separating a foreground and a background of each of the actual images is described in operation 111 with reference to FIG. 1 and will be further described below with reference to FIG. 4.

In operation 312, the processor may train a color transformation matrix that estimates a color value of the foreground.

In training a color transformation matrix, the processor may perform an operation of estimating the foreground color value from the background color value by using the stored foreground color values and the stored background color values. Operation 312 will be further described with reference to FIG. 4.

In operation 313, the processor may train a position estimator that estimates a position of the center of the foreground from a brightness value of each of the actual images.

In an operation of training the position estimator, the processor may calculate a brightness value of each pixel of the actual input images 101 and, based on a vertical sum, determine a position having the highest value as a horizontal position.

In the operation of training the position estimator, the processor may calculate the brightness value of each pixel of the actual input images 101 and, based on a horizontal sum, determine a position having the highest value as a vertical position.

In the operation of training the position estimator, the processor may store estimated horizontal positions and estimated vertical positions.

In the operation of training the position estimator, the processor may train a relationship between the width of the background and a horizontal position of the foreground of each of the actual input images 101 through a Gaussian process.

In operation 320, the processor may generate a target image from the input image based on a result of the training. The generating of the target image is further described below with reference to FIG. 3B.

Figure 3B:
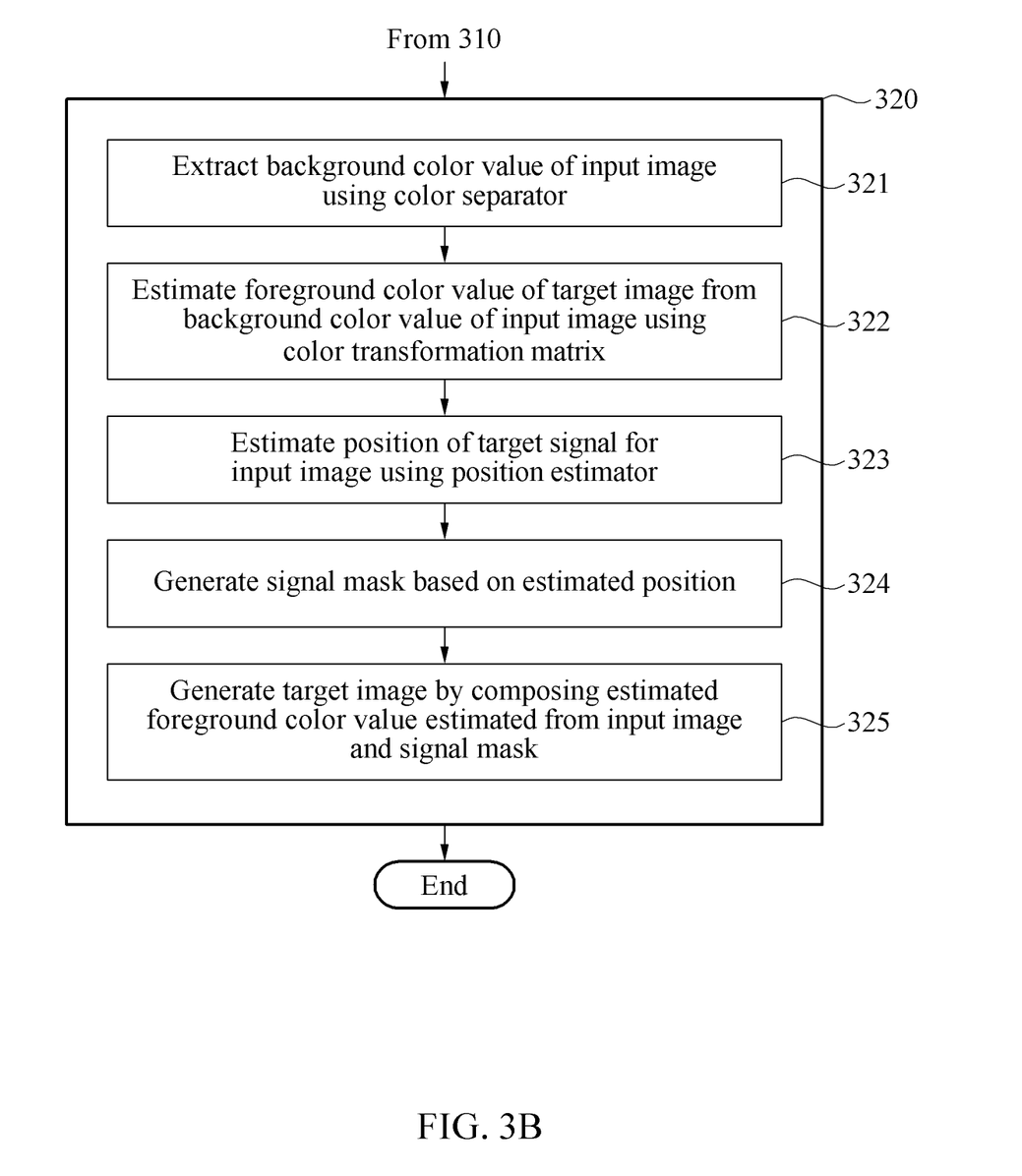
FIG. 3B illustrates an example of a target image generation process.

FIG. 3B illustrates an example of a target image generation process.

Referring to FIG. 3B, operations 320 to 325 may be performed by the processor described with reference to FIG. 2. The description given with reference to FIGS. 1 and 3A may be applicable to the description given with reference to FIG. 3B.

Operations of FIG. 3B may be performed in the shown order and manner. However, the order of some operations may change, or some of the operations may be omitted, without departing from the spirit and scope of the shown example. The operations shown in FIG. 3B may be performed in parallel or simultaneously.

In operation 320, the processor may generate a target image from an input image based on a result of the training.

In operation 321, the processor may extract a background color value of the input image by using a color separator.

In operation 322, the processor may estimate a foreground color value of the target image from the background color value of the input image using a color transformation matrix. Operation 322 is further described below with reference to FIG. 4.

In operation 323, the processor may estimate a position of a target signal for the input image using a position estimator.

In operation 324, the processor may generate a signal mask based on the estimated position.

In the operation of generating the signal mask, the processor may generate the signal mask using Gaussian filtering.

In the operation of generating the signal mask, the processor may generate the signal mask based on a rule. In some examples, the rule may be set in advance, i.e., the rule may be preset.

In the operation of generating the signal mask, the processor may add a highlight mask to the signal mask.

In the operation of generating the signal mask, the processor may add Gaussian noise to the signal mask.

In operation 325, the processor may generate a target image by composing the estimated foreground color value and the signal mask.

Figure 4:
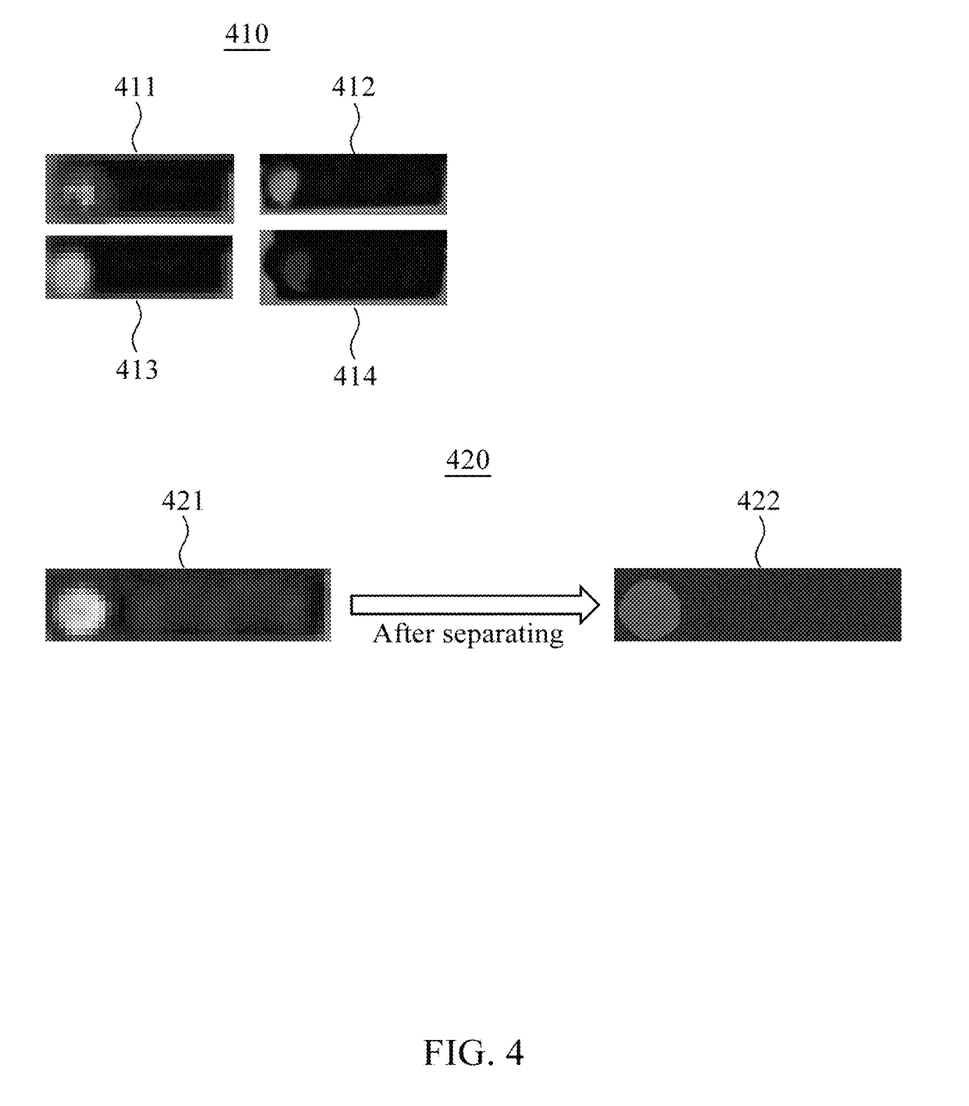
FIG. 4 illustrates an example of a signal image to describe a color transformation matrix.

FIG. 4 illustrates an example of a signal image to describe a color transformation matrix.

The description provided with reference to FIGS. 1 to 3 may be applicable to the description of FIG. 4.

Referring to FIG. 4, the processor may generate a color of a target signal suitable for a background of a traffic light image 410.

Referring to traffic light images 411 to 414 for training, even signals having the same color may correspond to different actual colors, depending on the surrounding environment. For example, when illuminance varies within a view of a traffic light when an image is captured, the same traffic light image may have different colors therein (for the same traffic light actual-color), because the illuminance has an influence on a processing process inside a camera sensor.

For example, the traffic light image 411 for training may be an image in which glare occurs, the traffic light image 412 for training may be an image in a clear environment, the traffic light image 413 for training may be an image in which a brightness of a signal is excessively observed, and the traffic light image 414 for training may be an image in which a signal is observed to be dark in a bright environment. However, the description of the present disclosure is not limited to the expressions of the described example and the expression of the traffic light images 411 to 414 for training is assumed arbitrarily and may be an image captured in another environment.

To compose a natural or realistic signal image (e.g., one with uniform or accurate colors for the respective traffic light lights/colors), the processor may express a color of a target signal differently depending on a surrounding environment in response to the background being influenced by the surrounding environment. The processor may express the color of the target signal differently, depending on the surrounding environment, by training a color transformation matrix that estimates the color of the foreground signal from the color of the background.

In operation 311, the processor may separate the foreground (e.g., a target signal) and the background (e.g., a back plate of a traffic light or a remaining part) from the traffic light images 411 to 414 for training.

The processor may extract a separated image 422 by separating an image 421 for training into the foreground and background.

In operation 312, the processor may obtain the color transformation matrix (e.g., the color transformation matrix W 112-1 of FIG. 1) by training a plurality of separated images 422 extracted from a plurality of images 421 for training. The color transformation matrix may transform the foreground color value based on the background color value affected by a surrounding environment.

For example, in the traffic light image 411 for glare training, the glare may occur in a target signal due to the influence of the surrounding environment. In addition, the glare phenomenon may also occur in the background of the traffic light image 411. The processor may separate the foreground and the background in the above environment by using the color separator. The processor may store the foreground color value and the background color value of the traffic light image 411 and train the color transformation matrix that estimates the foreground color value from the background color value. The influence of the surrounding environment in the present disclosure is not limited to the influence of the glare described above and the influence of other surrounding environments, such as, for example, shadows, weather conditions (e.g., snow or rain), etc. may also be considered.

In operation 322, the processor may estimate the foreground color value of the target image from the background color value of the input image by using the color transformation matrix. For example, the processor that has been trained on the traffic light image 411 for the glare training may observe the glare phenomenon in the background color value of the input image. When the glare phenomenon is observed, the processor may express the foreground color by implementing the trained glare phenomenon in the foreground of the target image by using the color transformation matrix.

The present disclosure is not limited to the disclosed examples and a change of the foreground color due to other phenomena, such as changes caused by cloudy weather may also be considered.

Figure 5A:
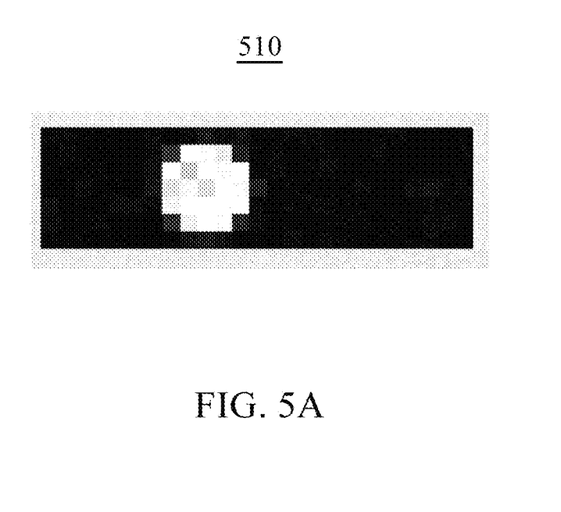
FIGS. 5A to 5C illustrate examples of a composite signal mask.
Figure 5B:
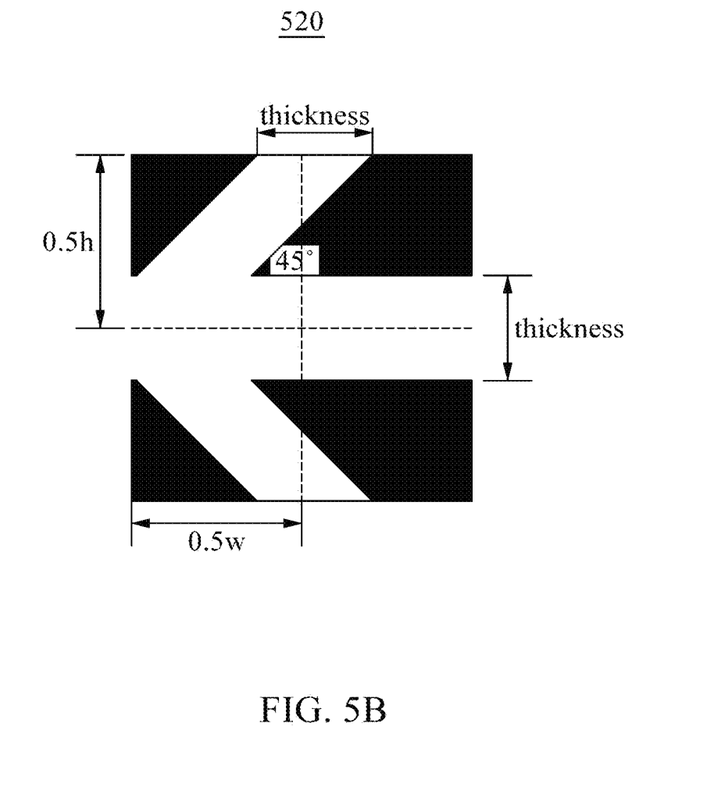
Figure 5C:
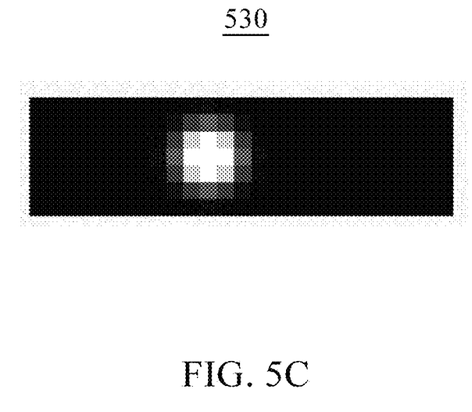

FIGS. 5A to 5C illustrate examples of a composite signal mask.

The description provided with reference to FIGS. 1 to 3B may be applicable to the description of FIGS. 5A and 5C.

In operation 324, the processor may generate a signal mask (e.g., the signal mask 232 of FIG. 2, and a circular signal composite mask 510, an arrow signal composite mask 520, or a highlight composite mask 530 of FIGS. 5A to 5C) based on the estimated position.

The processor may estimate a position of the center of a foreground by using a position estimator. The processor may express a foreground similar to a traffic light by generating a composite signal mask at the position of the center of the foreground.

Referring to FIG. 5A, the processor may generate the circular signal composite mask 510.

For example, assuming that a target signal image is a yellow signal, the processor may estimate a position of the target signal image relative to an input image by using the position estimator. Since the yellow signal is positioned second in the traffic light, the processor may estimate that a position of the center of the target signal is the center of the second signal of the background of the input image. Since the yellow signal of the traffic light is a circular signal, the processor may generate the circular signal composite mask 510 of a smooth circular area through Gaussian filtering based on the estimated center position of the circular signal.

Referring to FIG. 5B, the processor may generate the arrow signal composite mask 520. In some examples, the processor may generate the arrow signal composite mask 520 based on a rule. In some examples, the rule may be set in advance, i.e., the rule may be preset.

For example, the processor may receive the rule to generate the arrow signal composite mask 520. In the rule of an arrow signal, it may be assumed that a vertical length is 1 h and a horizontal length is 1 w. In the rule, the thickness of a central straight line may be 0.2 h by 0.1 h evenly based on the center of the signal. In the rule, an oblique line on the upper left side may be a straight line that is 0.1 h away from the left end in an upper direction and rises to the right 45 degrees (°) with a thickness of 0.2 w. In the rule, an oblique line on the lower left side may be a straight line that is 0.1 h away from the left end in the upper direction and descends to the right 45° with a thickness of 0.2 w. The processor may generate the arrow signal composite mask 520 based on the rule.

Referring to FIG. 5C, the processor may generate the highlight composite mask 530 (hereinafter, referred to as a highlight mask). The processor may add the highlight mask 530 to the circular signal composite mask 510. The processor may add the highlight mask 530 to the arrow signal composite mask 520.

For example, referring to the traffic light image 412 for training of FIG. 4, it may be seen that the center part of the circular signal shines brighter than the peripheral part of the circular signal. To generate a natural target signal image, the processor may separately generate the highlight mask 530 for expressing a highlight, which is a point where light of the central part is strong. The processor may generate the highlight mask 530 through Gaussian filtering.

The processor may compose the composite signal masks 510 or 520 and the highlight mask 530 as shown in Equation 4 below.

Equation 4

$$Img=(1-\text{mask})*bg\_img+(\text{mask})*fg\_img \quad (1)$$

$$Img=(1-HL\_\text{mask})*img+(HL\_\text{mask})*white\_img \quad (2)$$

Img: target image, bgimg: background image of input image, . . .

fgimg: forground image of input image, mask: signal mask

HLmask: highlight mask, whiteimg: color of highlight mask

The processor may add Gaussian noise to generate the signal masks and the highlight masks 510 to 530 as more natural masks.

Figure 6:
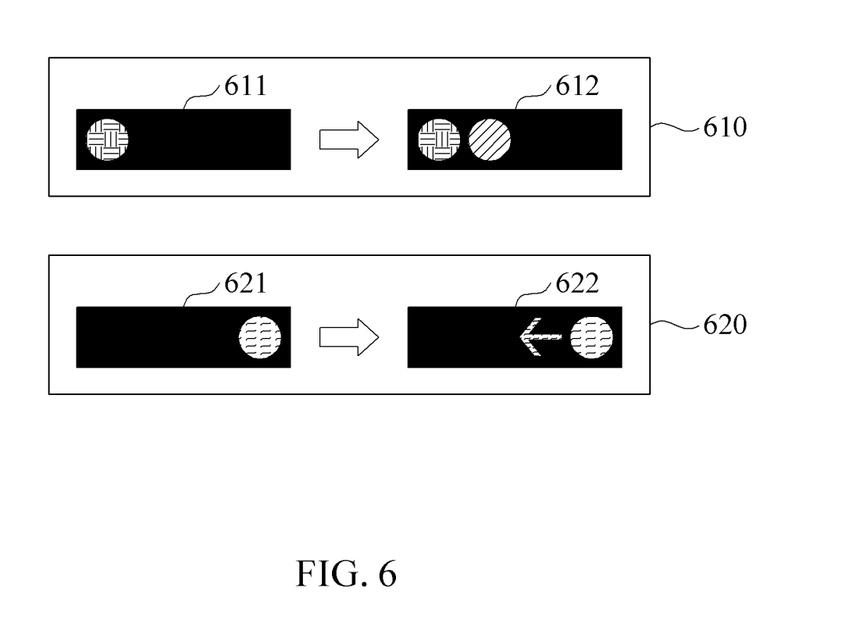
FIG. 6 illustrates an example of an image composite result.

FIG. 6 illustrates an example of an image composite result.

The description provided with reference to FIGS. 1 to 5C may be applicable to the description of FIG. 6.

Referring to FIG. 6, in a yellow signal image composition 610, the processor may generate, from a red signal image 611 (e.g., the input image 201 of FIG. 2), a traffic light image (e.g., the target image 202 of FIG. 2) including a yellow signal image 612.

In an arrow signal image composition 620, the processor may generate an arrow signal image 622 from a green signal image 621.

The processor may generate a final signal mask by performing element-wise multiplications between the signal mask and the highlight mask.

To generate a target image, the processor may compose two images by performing element-wise multiplications between the background image and 1—the final signal mask and applying the signal mask to the foreground color value.

For example, assuming that the target image is the yellow signal image 612, the processor may determine the estimated foreground color value 213 (e.g., yellow) as a result of operation 210 and the signal mask 232 (e.g., a circular signal) as a result of operations 220 and 230. The yellow signal image 612 may be produced by synthesizing the mask 232 (e.g., circular signals) with the estimated foreground color value 213 (e.g., yellow).

In another example, assuming that the target image is the arrow signal image 622, the processor may determine the estimated foreground color value 213 (e.g., green) as a result of operation 210 and the signal mask (e.g., an arrow signal) as a result of operations 220 and 230 (e.g., arrow signals). The arrow signal image 622 may be produced by synthesizing the signal mask (e.g., an arrow signal) with the estimated foreground color value 213 (e.g., green).

FIG. 7 illustrates an example of a configuration of an electronic device 700. In an example, the electronic device 700 may be a device for composing an image.

An electronic device 700 in an example may include a sensor 710, a processor 720, a memory 730, and an output device 740.

The sensor 710 may generate sensing data by receiving a signal (e.g., visible rays, a RADAR signal, light, ultrasonic waves, or infrared rays). For example, the sensor 710 may include a camera sensor, a RADAR sensor, a LiDAR sensor, an ultrasonic sensor, or an infrared sensor. The camera sensor may generate image data as sensing data by sensing and receiving light (e.g., light in a visible band) reflected from a physical point (e.g., a point on an obstacle object). The RADAR sensor may generate RADAR data by radiating and receiving a RADAR signal. The LiDAR sensor may generate LiDAR data by radiating and receiving light. The ultrasonic sensor may generate ultrasonic data by radiating and receiving an ultrasonic wave. The infrared sensor may generate infrared data by sensing infrared ray radiated from an object.

The processor 720 may control at least one other component of the electronic device 100 and perform processing of various pieces of data or computations. The processor 720 may control an overall operation of the electronic device 700 and may execute corresponding processor-readable instructions for performing operations of the electronic device 700. The processor 720 may execute, for example, software stored in the memory 720 to control one or more hardware components, such as, sensor 710 of the electronic device 700 connected to the processor 720 and may perform various data processing or operations, and control of such components.

The processor 720 may receive one more actual images and generate a target image from an input image based on a training of the processor. In some examples, the processor 720 may separate a foreground and a background of each of the actual images using a color separator. In some examples, the processor 720 may train a color transformation matrix configured to estimate a color value of the foreground. In some examples, the processor 720 may train a position estimator configured to estimate a position of a center of the foreground from a brightness value of each of the actual images. In some examples, the color separator and the position estimator are implemented on the processor 720. However, the operation of the processor 720 is not limited thereto, and the processor 720 may perform at least one of the operations described with reference to FIGS. 1 to 6 in parallel or in a time series.

The processor 720 may be a hardware-implemented data processing device. The hardware-implemented data processing device 720 may include, for example, a main processor (e.g., a central processing unit (CPU), a field-programmable gate array (FPGA), or an application processor (AP)) or an auxiliary processor (e.g., a GPU, a neural processing unit (NPU), an image signal processor (ISP), a sensor hub processor, or a communication processor (CP)) that is operable independently of, or in conjunction with the main processor. Further details regarding the processor 720 are provided below.

The memory 730 may store information required to determine the active sensing position. For example, the memory 730 may store the sensing data, and color transformation matrix. However, this is only an example, and the information stored in the memory 730 is not limited thereto. In an example, the memory 730 may store a program (or an application, or software). The stored program may be a set of syntaxes that are coded and executable by the processor 720 to operate the electronic device 700. The memory 730 may include a volatile memory or a non-volatile memory.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 730 are provided below.

In some examples, the processor 710 may output the image composite result through the output device 740. In some examples, the output device 740 may provide an output to a user through auditory, visual, or tactile channel. The output device 740 may include, for example, a speaker, a display, a touchscreen, a vibration generator, and other devices that may provide the user with the output. The output device 740 is not limited to the example described above, and any other output device, such as, for example, computer speaker and eye glass display (EGD) that are operatively connected to the electronic device 740 may be used without departing from the spirit and scope of the illustrative examples described. In an example, the output device 740 is a physical structure that includes one or more hardware components that provide the ability to render a user interface, output information and speech, and/or receive user input.

In some examples, the electronic device 700 may be installed or wirelessly connected to a vehicle. Hereinafter, a vehicle refers to any mode of transportation, delivery, or communication such as, for example, for example, an automobile, a truck, a tractor, a scooter, a motorcycle, a cycle, an amphibious vehicle, a snowmobile, a boat, a public transit vehicle, a bus, a monorail, a train, a tram, an autonomous vehicle, an unmanned aerial vehicle, a bicycle, a walking assist device (WAD), a robot, a drone, and a flying object such as an airplane. In some examples, the vehicle may be, for example, an autonomous vehicle, a smart mobility, an electric vehicle, an intelligent vehicle, an electric vehicle (EV), a plug-in hybrid EV (PHEV), a hybrid EV (HEV), or a hybrid vehicle, an intelligent vehicle equipped with an advanced driver assistance system (ADAS) and/or an autonomous driving (AD) system.

In some examples, the autonomous vehicle is a self-driving vehicle that is equipped with one or more sensors, cameras, radio detection and ranging (RADAR), light detection and ranging (LiDAR) sensor, an infrared sensor, and an ultrasonic sensor, and/or other data-capturing devices that collect information about the surrounding environment. The autonomous vehicle may be controlled by an onboard computer system that uses algorithms, machine learning, and other artificial intelligence techniques to interpret the sensor data and to make decisions based on that information. The computer system can control the vehicle's speed, direction, acceleration, and braking, as well as other systems such as lighting, heating, and air conditioning. In some examples, the autonomous vehicle may be equipped with communication technologies to interact with other vehicles, infrastructure, and/or a central control system(s). The autonomous vehicle may operate in various modes, such as, for example, fully autonomous, semi-autonomous, and remote control where it is controlled by the central control system(s).

In some examples, the electronic device 700 may be implemented as, or in, various types of computing devices, such as, a personal computer (PC), a data server, or a portable device. In an example, the portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), or a smart device. In an example, the computing devices may be a wearable device, such as, for example, a smart watch and an apparatus for providing augmented reality (AR) (hereinafter simply referred to as an AR provision device) such as AR glasses, a head mounted display (HMD), various Internet of Things (IoT) devices that are controlled through a network, and other consumer electronics/information technology (CE/IT) devices.

The above-described embodiments may be applied not only to a horizontal traffic light described above, but also to a vertical traffic light. In addition, the present disclosure may be applied not only to a circular yellow signal and an arrow green signal, which are non-limiting examples of the present disclosure, but also to a traffic light such as a pedestrian traffic light.

The computing apparatuses, the electronic devices, the processors, the memories, and other components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of composing a target image, the method comprising:
    separating a foreground and a background of each of the one or more actual images using a color separator;
    training a color transformation matrix configured to estimate a color value of the foreground;
    training a position estimator configured to estimate a position of a center of the foreground from a brightness value of each of the one or more actual images; and
    generating the target image based on inputting an input image to the position estimator and the color separator.

2. The method of claim 1, wherein the generating of the target image comprises:
    extracting a color value of a background of the input image using the color separator;
    determining a color value of a foreground of the target image from the color value of the background, using the color transformation matrix;
    determining a position of a target signal for the input image using the position estimator;
    generating a signal mask based on the position; and
    generating the target image by composing the color value of the foreground and the signal mask.

3. The method of claim 2, wherein the generating of the signal mask comprises generating the signal mask using Gaussian filtering.

4. The method of claim 2, wherein the generating of the signal mask comprises generating the signal mask based on a preset rule.

5. The method of claim 2, wherein the generating of the signal mask comprises adding a highlight mask to the signal mask.

6. The method of claim 2, wherein the generating of the signal mask comprises adding Gaussian noise to the signal mask.

7. The method of claim 1, wherein the separating of the foreground and the background comprises:
    comparing a representative color value of the foreground to a representative color value of the background of each of the one or more actual images; and
    separating and storing color values of the foreground and color values of the background, based on a result of the comparing.

8. The method of claim 7, wherein the training of the color transformation matrix comprises estimating the color value of the foreground from a color value of the background, using the stored color values of the foreground and the stored color values of the background.

9. The method of claim 1, wherein the training of the position estimator comprises:
    calculating a brightness value of each of pixels of the one or more actual images and obtaining vertical sums and horizontal sums of each of the pixels;
    estimating a position having a highest value among the vertical sums as a horizontal position;
    estimating a position having a highest value among the horizontal sums as a vertical position; and
    storing the horizontal position and the vertical position.

10. The method of claim 9, wherein the training of the position estimator comprises:
    training a relationship between the background of each of the one or more actual images and the horizontal position through a Gaussian process; and
    training a relationship between the background of each of the one or more actual images and the vertical position through a Gaussian process.

11. An apparatus for composing a target image, the apparatus comprising:
    a processor configured to:
    separate a foreground and a background of an actual image using a color separator;
    train a color transformation matrix configured to estimate a color value of the foreground;
    train a position estimator configured to estimate a position of a center of the foreground from a brightness value of each of the one or more actual images, and
    generate the target image based on inputting an input image to the position estimator and the color separator.

12. The apparatus of claim 11, wherein the processor is further configured to:
    extract a color value of a background of the input image using the color separator;
    determine a color value of a foreground of the target image from the color value of the background, using the color transformation matrix;
    determine a position of a target signal for the input image using the position estimator;
    generate a signal mask based on the position; and
    generate the target image by composing the color value of the foreground and the signal mask.

13. The apparatus of claim 12, wherein the processor is further configured to generate the signal mask using Gaussian filtering.

14. The apparatus of claim 12, wherein the processor is further configured to generate the signal mask based on a preset rule.

15. The apparatus of claim 12, wherein the processor is further configured to add a highlight mask to the signal mask.

16. The apparatus of claim 12, wherein the processor is further configured to add Gaussian noise to the signal mask.

17. The apparatus of claim 11, wherein the color separator is configured to:
    compare a representative color value of the foreground to a representative color value of the background of each of the one or more actual images; and separate and store color values of the foreground and color values of the background, based on a result of the comparison.

18. The apparatus of claim 17, wherein the processor is further configured to estimate the color value of the foreground from a color value of the background, using the stored color values of the foreground and the stored color values of the background.

19. The apparatus of claim 11, wherein the processor is further configured to:
   calculate a brightness value of each of pixels of the one or more actual images and obtain vertical sums and horizontal sums of each of the pixels;
   estimate a position having a highest value among the vertical sums as a horizontal position;
   estimate a position having a highest value among the horizontal sums as a vertical position; and
   store the horizontal position and the vertical position.

20. The apparatus of claim 19, wherein the processor is further configured to:
   train a relationship between the background of each of the one or more actual images and the horizontal position through a Gaussian process; and
   train a relationship between the background of each of the one or more actual images and the vertical position through a Gaussian process.

* * * * *